United States Patent
Pelly et al.

(10) Patent No.: US 8,015,410 B2
(45) Date of Patent: Sep. 6, 2011

(54) DATA PROCESSING APPARATUS AND METHOD

(75) Inventors: Jason Charles Pelly, Reading (GB); Daniel Warren Tapson, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 977 days.

(21) Appl. No.: 10/728,539

(22) Filed: Dec. 5, 2003

(65) Prior Publication Data

US 2004/0168065 A1    Aug. 26, 2004

(30) Foreign Application Priority Data

Dec. 9, 2002 (GB) .................... 0228665.6

(51) Int. Cl.
*G06F 9/00* (2006.01)
(52) U.S. Cl. ........................................ 713/176
(58) Field of Classification Search .......... 713/176; 708/403; 382/100
See application file for complete search history.

(56) References Cited

U.S. PATENT DOCUMENTS

| | | | | |
|---|---|---|---|---|
| 5,915,027 | A * | 6/1999 | Cox et al. | 380/54 |
| 6,252,972 | B1 * | 6/2001 | Linnartz | 382/100 |
| 6,505,223 | B1 * | 1/2003 | Haitsma et al. | 708/403 |
| 6,971,012 | B1 * | 11/2005 | Shimizu et al. | 713/176 |
| 7,013,023 | B2 * | 3/2006 | Ehrmann Patin et al. | 382/100 |
| 2006/0023913 | A1 * | 2/2006 | Muratani | 382/100 |

FOREIGN PATENT DOCUMENTS

| | | |
|---|---|---|
| EP | 0 840 513 A2 | 5/1998 |
| EP | 1 187 478 | 3/2002 |
| EP | 1 215 908 A2 | 6/2002 |
| EP | 1 217 840 | 6/2002 |

(Continued)

OTHER PUBLICATIONS

Inoue H et al: "Wavelet-based watermarking for tamper proofing of still images" Proceedings 2000 International Conference in Image Processing, vol. 2, Sep. 10, 2000, pp. 88-91, XP010529930 Vancouver, Canada.

(Continued)

*Primary Examiner* — Nasser Moazzami
*Assistant Examiner* — Daniel L Hoang
(74) *Attorney, Agent, or Firm* — Oblon, Spivak, McClelland, Maier & Neustadt, L.L.P.

(57) ABSTRACT

A data processing apparatus is operable to identify one of a plurality of code words present in a watermarked version of a material item. The marked version is formed by combining each of a plurality of parts of a code word with one of a plurality of units from which the material item is comprised. The apparatus comprises a recovery processor operable to recover at least one part of the code word from a corresponding unit of the marked material item, and a correlator. The correlator is operable to generate for the marked material unit, a dependent correlation value for the part of the code word recovered from the material unit and the corresponding part of at least one of the re-generated code words from the set. A detector is operable to determine whether at least one of the code words is present in the marked material item from the dependent correlation value for the part of the code word exceeding a predetermined threshold. The data processor may detect the presence of the code word with improved probability, in particular when parts of the material have been corrupted.

22 Claims, 6 Drawing Sheets

FOREIGN PATENT DOCUMENTS

| | | |
|---|---|---|
| JP | 10-145757 | 5/1998 |
| JP | 2002-185762 | 6/2002 |
| JP | 2002-305650 | 10/2002 |
| WO | WO 02/17631 | 2/2002 |

OTHER PUBLICATIONS

Veen Van Der M et al: "Robust Multi-Functional and High-Quality Audio Watermarking Technology" Preprints of Papers Presented At the AES Convention, XX, XX, vol. 110, No. 5345, May 12, 2001, pp. 1-9, XP001086463.

Yao Zhao et al: "Video watermarking scheme resistant to geometric attacks" Proceedings 2002 International Conference on Image Processing. ICIP 2002. Rochester, NY, Sep. 22-25, 2002, vol. vol. 2 of 3, Sep. 22, 2002, pp. 145-148, XP010607929 ISBN: 0-7803-7622.6.

Vesecky J F et al: "Observation of sea-ice dynamics using synthetic aperture radar images: automated analysis" IEEE Transactions on Geoscience and Remote Sensing, Jan. 1988, USA, vol. 26, No. 1, 1988 38-48, XP002284381 ISSN: 0196-2892.

* cited by examiner

DATA PROCESSING APPARATUS AND METHOD

FIELD OF INVENTION

The present invention relates to data processing apparatus and methods, which are arranged to detect code words present in material items. In some applications the code words are used to uniquely identify the material items.

The material could be, for example, any of video, audio, audio/video material, software programs, digital documents or any type of information bearing material.

BACKGROUND OF THE INVENTION

A process in which information is embedded in material for the purpose of identifying the material is referred to as watermarking.

Identification code words are applied to versions of material items for the purpose of identifying the version of the material item. Watermarking can provide, therefore, a facility for identifying a recipient of a particular version of the material. As such, if the material is copied or used in a way which is inconsistent with the wishes of the distributor of the material, the distributor can identify the material version from the identification code word and take appropriate action.

Co-pending UK patent applications with serial numbers 0129840.5, 0129836.3, 0129865.2, 0129907.2 and 0129841.3 provide a practical watermarking scheme in which a plurality of copies of material items are marked with a digital watermark formed from a code word having a predetermined number of coefficients. The watermarked material item is for example an image. In one example, the apparatus for introducing the watermark transforms the image into the Discrete Cosine Transform (DCT) domain. The digital watermark is formed from a set of randomly distributed coefficients having a normal distribution. In the DCT domain each code word coefficient is added to a corresponding one of the DCT coefficients. The watermarked image is formed by performing an inverse DCT.

Any watermarking scheme should be arranged to make it difficult for users receiving copies of the same material to collude successfully to alter or remove an embedded code word. A watermarking scheme should therefore with high probability identify a marked material item, which has been the subject of a collusion attack. This is achieved by identifying a code word recovered from the offending material. Conversely, there should be a low probability of not detecting a code word when a code word is present (false negative probability). In addition the probability of falsely detecting a user as guilty, when this user is not guilty, should be as low as possible (false positive probability).

SUMMARY OF INVENTION

The probability of correctly detecting a code word can be reduced if a code word has been corrupted. The code word may be corrupted for example, as a result of processing of the material item as a deliberate attempt to remove the code word or during a process of recovering the code word from the material item. As a result, the false negative detection probability can increase in the presence of corruption in the marked material item. Accordingly it is an object of the present invention to increase a probability of detecting a code word in a material item, thereby correspondingly reducing the false negative detection probability, in the presence of corruption.

According to an aspect of the present invention there is provided a data processing apparatus operable to identify one of a plurality of code words present in a marked version of a material item. The marked version has been formed by combining each of a plurality of parts of a code word with one of a plurality of units from which the material item is comprised. The apparatus comprises a recovery processor operable to recover at least one part of the code word from a corresponding unit of the marked material item, and a correlator. The correlator is operable to generate for the marked material unit a dependent correlation value for the part of the code word recovered from the material unit and the corresponding part of at least one of the re-generated code words from the set. A detector is operable to determine whether at least one of the code words is present in the marked material item from the dependent correlation value for the part of the code word exceeding a predetermined threshold.

The above mentioned co-pending UK patent applications disclose a watermarking system for marking material items with code words and for detecting the code words in suspect material items which have been used in ways which offend the owner or distributor of the material items. The system includes aspects, which facilitate an encoding process through which material is marked with code words and a detecting process. As explained above, the code words are detected in accordance with a predetermined false positive and false negative detection probability. A detector calculates correlation values representing the correlation of a version of the code word recovered from the material and each of the code words of the set re-generated within the detector. Code words are detected if any of the correlation values for the re-generated code words exceeds a threshold determined in accordance with the false positive and false negative detection probabilities.

It has been discovered that one factor in reducing the probability of correctly detecting a code word, and hence increasing the false negative detection probability is presence of corruption in the marked material item. The corruption can have an effect that the parts of the code word recovered from units of the material may be corrupted. The corrupted parts can have a detrimental effect on the correlation value calculated for a particular code word. The effect of some corrupted material units can prevent a correlation value exceeding the threshold by biasing the calculation to prevent the correlation value exceeding the threshold for the correct code word.

In the watermarking system disclosed in the above-mentioned UK patent applications, the whole code word is recovered from the material and used to calculate the correlation value. Accordingly, the calculation provides a correlation value, which is independent of local statistical variations of the content of the material and the content of the parts of the code word.

To address a problem associated with a reduction in the correlation value resulting from corrupt parts of the material, a dependent correlation value is formed.

The dependent correlation value is formed by calculating the correlation value of a part of the code word only. If the dependent correlation value is sufficient to exceed the threshold according to the predetermined false detection probability, then a code word can be declared as being present. However, if the dependent correlation value is not sufficient to exceed the threshold, then the part of the code word is combined with a part of the code word recovered from a subsequent image and the dependent correlation value re-calculated.

If the dependent correlation value for the plurality of successive images does not exceed the threshold, then the parts of the code word recovered from the next plurality of successive material units may be combined and the dependent correlation value for these parts determined. If the threshold is exceeded then the corresponding code word is identified as being present. However, if the threshold is not exceeded, then the parts of the code word from the first plurality of images is combined with the parts from the second plurality of images iteratively, providing an increased code word length, the dependent correlation value being re-calculated, with a proportionally increased likelihood of exceeding the threshold. This process is repeated for a subsequent plurality of images, providing yet further correlation values and increasing the length of the part of the code word used to determine the dependent correlation value in a hierarchical fashion.

If the dependent correlation value for any part of the code word includes parts, which have been corrupted, then the dependent correlation value produced from these parts will be unlikely to exceed the threshold. However, since other dependent correlation values will not include these corrupted parts, these dependent correlation values may exceed the threshold, whereas the independent correlation value determined for the whole code word may not have exceeded the threshold. This is because the parts of the code words from the corrupted images would be included in the calculation of the independent correlation value.

Various further aspects and features of the present invention are defined in the appended claims.

BRIEF DESCRIPTION OF DRAWINGS

Embodiments of the present invention will now be described by way of example only with reference to the accompanying drawings, where like parts are provided with corresponding reference numerals, and in which.

DESCRIPTION OF EXAMPLE EMBODIMENTS

Watermarking System Overview

An example embodiment of the present invention will now be described with reference to protecting video images. The number of users to which the video images are to be distributed determines the number of copies. To each copy an identification code word is added which identifies the copy assigned to one of the users.

Video images are one example of material, which can be protected by embedding a digital code word. Other examples of material, which can be protected by embedding a code word, include software programs, digital documents, music, audio signals and any other information-bearing signal.

Figure 1:
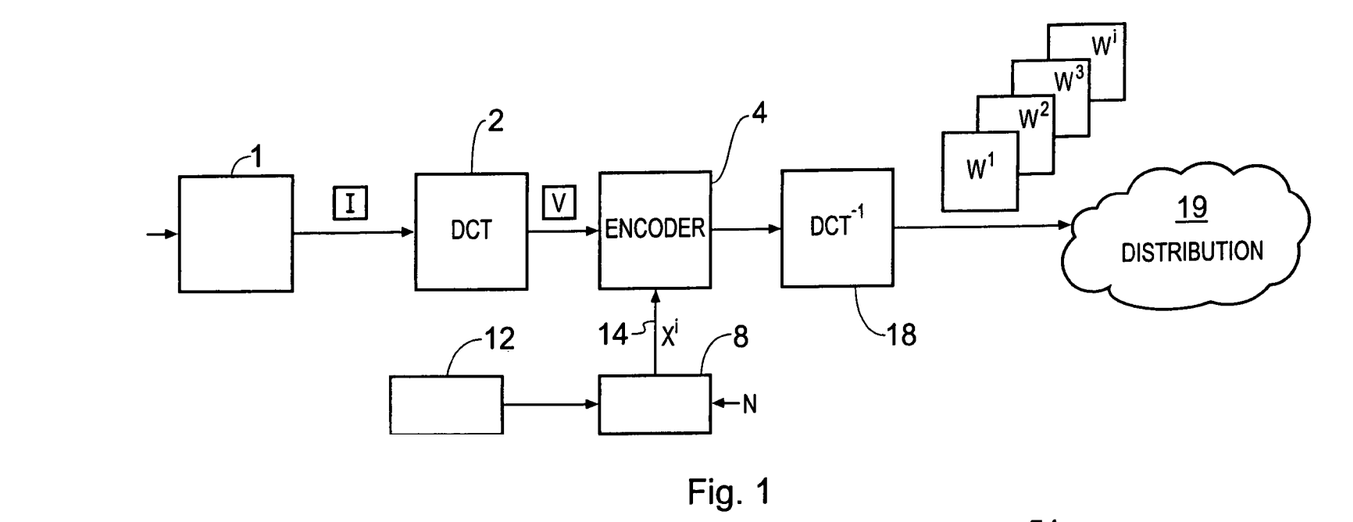
FIG. 1 is a schematic block diagram of an encoding image processing apparatus.

An example of an encoding image processing apparatus, which is arranged to introduce an identification code word into a copy of an original image, is shown in FIG. 1. An original image I is received from a source and stored in a frame store 1. This original image is to be reproduced as a plurality of water marked copies, each of which is marked with a uniquely identifiable code word. The original image is passed to a Discrete Cosine Transform (DCT) processor 2, which divides the image into 8×8 pixel blocks and forms a DCT of each of the 8×8 pixel blocks. The DCT processor 2 therefore forms a DCT transformed image V.

In the following description the term "samples" will be used to refer to discrete samples from which an image (or indeed any other type of material) is comprised. The samples may be luminance samples of the image, which is otherwise, produced from the image pixels. Therefore, where appropriate the terms samples and pixels are inter-changeable.

The DCT image V is fed to an encoding processor 4. The encoding processor 4 also receives identification code words from an identification code word generator 8.

The code word generator 8 is provided with a plurality of seeds, each seed being used to generate one of the corresponding code words. Each of the generated code words may be embedded in a copy of the original image to form a watermarked image. The code word generator 8 is provided with a pseudo random number generator. The pseudo random number generator produces the code word coefficients to form a particular code word. In preferred embodiments the coefficients of the code words are generated in accordance with a normal distribution. However, the coefficients of the code word are otherwise predetermined in accordance with the seed, which is used to initialise the random number generator. Thus for each code word there is a corresponding seed which is store in a data store 12. Therefore it will be understood that to generate the code word $X^i$, $seed_i$ is retrieved from memory 12 and used to initialise the random number generator within the code word generator 8.

In the following description the DCT version of the original image is represented as V, where;

$$V=\{v_i\}=\{v_1,v_2,v_3,v_4,\ldots v_N\}$$

and $v_i$ are the DCT coefficients of the image. In other embodiments the samples of the image $v_i$ could represent samples of the image in the spatial domain or in an alternative domain.

Each of the code words $X^i$ comprises a plurality of n code word coefficients, where;

$$X^i=\{x_j^i\}=\{x_1^i,x_2^i,x_3^i,x_4^i,\ldots x_n^i\}$$

The number of code word coefficients n corresponds to the number or samples of the original image V. However, a different number of coefficients is possible, and will be set in dependence upon a particular application.

A vector of code word coefficients $X^i$ forming the i-th code word is then passed via channel 14 to the encoder 4. The encoder 4 is arranged to form a watermarked image $W^i$ by adding the code word $X^i$ to the image V. Effectively, therefore, as represented in the equation below, each of the code word coefficients is added to a different one of the coefficients of the image to form the watermark image $W^i$.

$$W^i = V + X^i$$

$$W^i = v_1 + x_1^i, v_2 + x_2^i, v_3 + x_3^i, v_4 + x_4^i \ldots v_n + x_n^i$$

As shown in FIG. 1, the watermarked images $W^i$ are formed at the output of the image processing apparatus by forming an inverse DCT of the image produced at the output of the encoding processor 4 by the inverse DCT processor 18.

Therefore as represented in FIG. 1 at the output of the encoder 4 a set of the watermarked images can be produced. For a data word of up to 20-bits, one of 10 000 000 code words can be selected to generate 10 million watermarked $W^i$ versions of the original image I.

Although the code word provides the facility for uniquely identifying a marked copy $W^i$ of the image I, in other embodiments the 20-bits can provide a facility for communicating data within the image. As will be appreciated therefore, the 20-bits used to select the identification code word can provide a 20-bit pay-load for communicating data within the image V.

The encoding image processing apparatus which is arranged to produce the watermarked images shown in FIG. 1 may be incorporated into a variety of products for different scenarios in which embodiments of the present invention find application. For example, the encoding image processing apparatus may be connected to a web site or web server from which the watermarked images may be downloaded. Before downloading a copy of the image, a unique code word is introduced into the downloaded image, which can be used to detect the recipient of the downloaded image at some later point in time.

In another application the encoding image processor forms part of a digital cinema projector in which the identification code word is added during projection of the image at, for example, a cinema. Thus, the code word is arranged to identify the projector and the cinema at which the images are being reproduced. Accordingly, the identification code word can be identified within a pirate copy produced from the images projected by the cinema projector in order to identify the projector and the cinema from which pirate copies were produced. Correspondingly, a watermarked image may be reproduced as a photograph or printout in which a reproduction or copy may be made and distributed. Generally therefore, the distribution of the watermarked images produced by the encoding image processing apparatus shown in FIG. 1 is represented by a distribution cloud 19.

Detecting Processor

Figure 2:
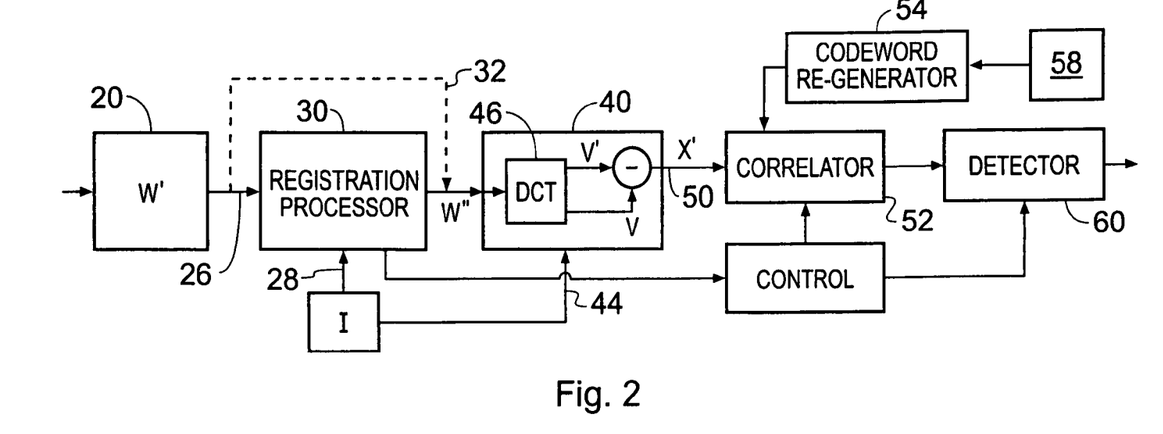
FIG. 2 is a schematic block diagram of a detecting image processing apparatus.

A detecting data processing apparatus which is arranged to detect one or more of the code words, which may be present in an offending marked material is shown in FIG. 2. Generally, the data processing apparatus shown in FIG. 2 operates to identify one or more of the code words, which may be present in an offending copy of the material.

The offending version of a watermarked video image W' is received from a source and stored in a frame store 20. Also stored in the frame store 24 is the original version of the video image I, since the detection process performed by the detecting apparatus requires the original version of the video image. The offending watermarked image W' and the original version of the image are then fed via connecting channels 26, 28 to a registration processor 30.

As already explained, the offending version of the image W' may have been produced by photographing or otherwise reproducing a part of the watermarked image $W^i$. As such, in order to improve the likelihood of detecting the identification code word, the registration processor 30 is arranged to substantially align the offending image with the original version of the image present in the data stores 20 and 24. The purpose of this alignment is to provide a correspondence between the original image samples I and the corresponding samples of the watermarked image $W^i$ to which the code word coefficients have been added.

Figure 3A:
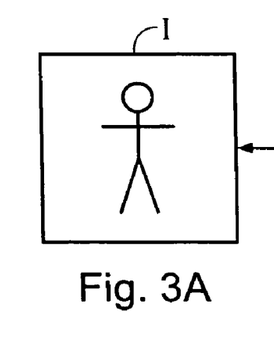
FIG. 3A is a representation of an original image.
Figure 3B:
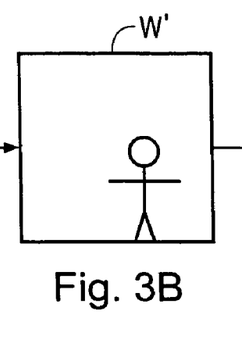
FIG. 3B is a representation of a marked image and FIG. 3C is the marked image after registration.
Figure 3C:
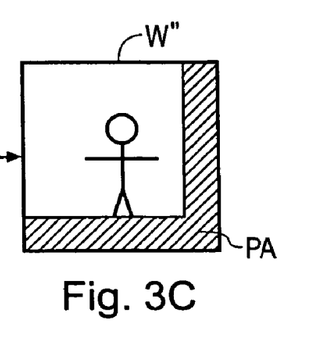

The effects of the registration are illustrated in FIGS. 3A, 3B and 3C. In FIG. 3A an example of the original image I is shown with respect to an offending marked version of the image W' in FIG. 3B. As illustrated in FIG. 3B, the watermarked image W' is offset with respect to the original image I and this may be due to the relative aspect view of the camera from which the offending version of the watermarked image was produced.

In order to recover a representation of the code word coefficients, the correct samples of the original image should be subtracted from the corresponding samples of the marked offending image. To this end, the two images are aligned. As shown in FIG. 3C, the registered image W''' has a peripheral area PA which includes parts which were not present in the original image.

As will be appreciated in other embodiments, the registration processor 30 may not be used because the offending image W' may be already substantially aligned to the originally version of the image I, such as, for example, if the offending version was downloaded via the Internet. Accordingly, the detecting apparatus is provided with an alternative channel 32, which communicates the marked image directly to the recovery processor 40.

The registered image W''' is received by a recovery processor 40. The recovery processor 40 also receives a copy of the original image I via a second channel 44. The registered image W''' and the original image I are transformed by a DCT transform processor 46 into the DCT domain. An estimated code word X' is then formed by subtracting the samples of the DCT domain marked image V' from the DCT domain samples of the original image V as expressed by the following equations:

$$\begin{aligned} X' &= V' - V \\ &= v_1' - v_1, v_2' - v_2, v_3' - v_3, v_4' - v_4, \ldots, v_n' - v_n, \\ &= x_1', x_2', x_3', x_4', \ldots, x_n' \end{aligned}$$

The output of the recovery processor 40 therefore provides on a connecting channel 50 an estimate of the coefficients of the code word which is to be identified. The recovered code word X' is then fed to a first input of a correlator 52. The correlator 52 also receives on a second input the regenerated code words $X^i$ produced by the code word generator 54. The code word generator 54 operates in the same way as the code word generator 8 which produces all possible code words of the set, using the predetermined seeds which identify uniquely the code words from a store 58.

The correlator 52 forms n similarity sim(i) values. In one embodiment, the similarity value is produced by forming a correlation in accordance with following equation:

$$sim(i) = \frac{X^i \cdot X'}{\sqrt{X^i \cdot X'}} = \frac{x_1^i \cdot x_1' + x_2^i \cdot x_2' + x_3^i \cdot x_3' + \ldots + x_n^i \cdot x_n'}{\sqrt{x_1^i \cdot x_1^i + x_2^i \cdot x_2^i + x_3^i \cdot x_3^i + \ldots + x_n^i \cdot x'}}$$

Figure 4:
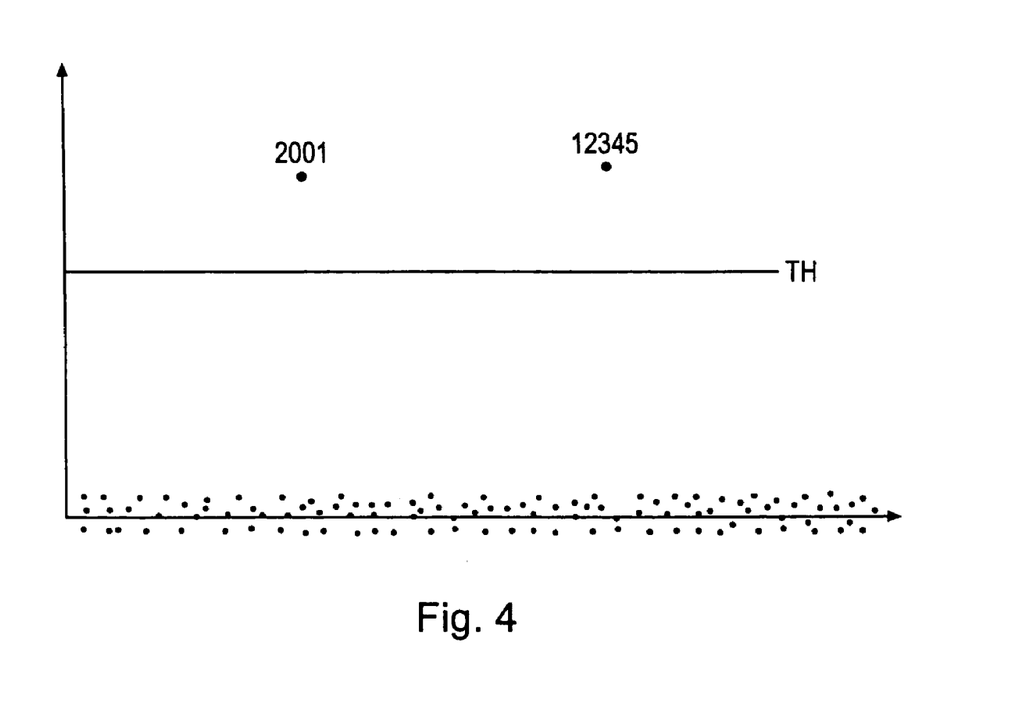
FIG. 4 is a graphical representation of an example correlation result for each of N code words in a set of code words.

Each of the n similarity values sim(i) is then fed to a detector 60. The detector 60 then analyses the similarity values sim(i) produced for each of the n possible code words. As an example, the similarity values produced by the correlator 52 are shown in FIG. 4 with respect to a threshold TH for each of the possible code words. As shown in FIG. 4, two code words are above the threshold, 2001, 12345. As such, the detecting processor concludes that the watermarked version associated with code word 2001 and code word 12345 must have colluded in order to form the offending image. Therefore, in accordance with a false positive detection probability, determined from the population size, which in this case is 10 million and the watermarking strength α, the height of the threshold TH can be set in order to guarantee the false detection probability. As in the example in FIG. 4, if the correlation values produced by the correlator 52 exceed the threshold then, with this false positive probability, the recipients of the marked image are considered to have colluded to form the offending watermarked version of the image $W^i$.

Registration

The process of aligning the offending marked version of the image with the copy of the original image comprises correlating the samples of the original image with respect to the marked image. The correlation is performed for different shifts of the respective samples of the images. This is illustrated in FIG. 5.

Figure 5A:
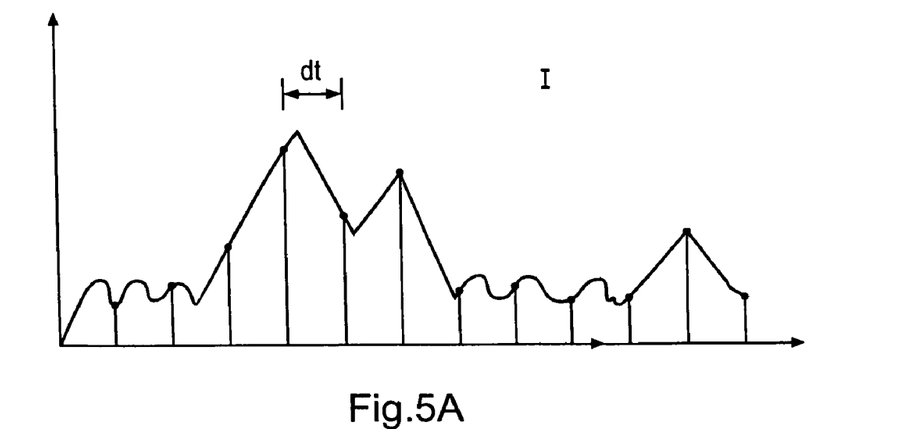
FIG. 5A is a graphical representation of samples of the original image I.
Figure 5B:
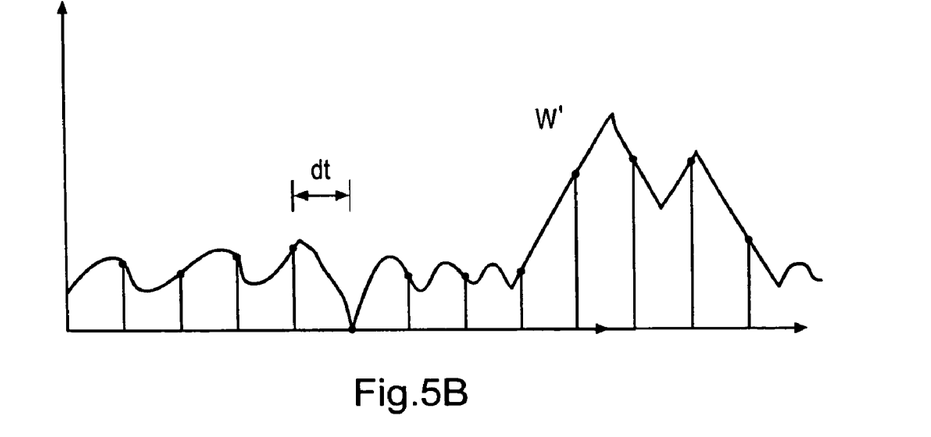
FIG. 5B is a graphical representation of samples of the watermarked image W'.

FIG. 5A provides an illustration of discrete samples of the original image I, whereas FIG. 5B provides an illustration of discrete samples of the offending watermarked image W' As illustrated in the FIGS. 5A and 5B, the sampling rate provides a temporal difference between samples of dt. A result of shifting each of the sets of samples from the images and correlating the discrete samples is illustrated in FIG. 5C.

Figure 5C:
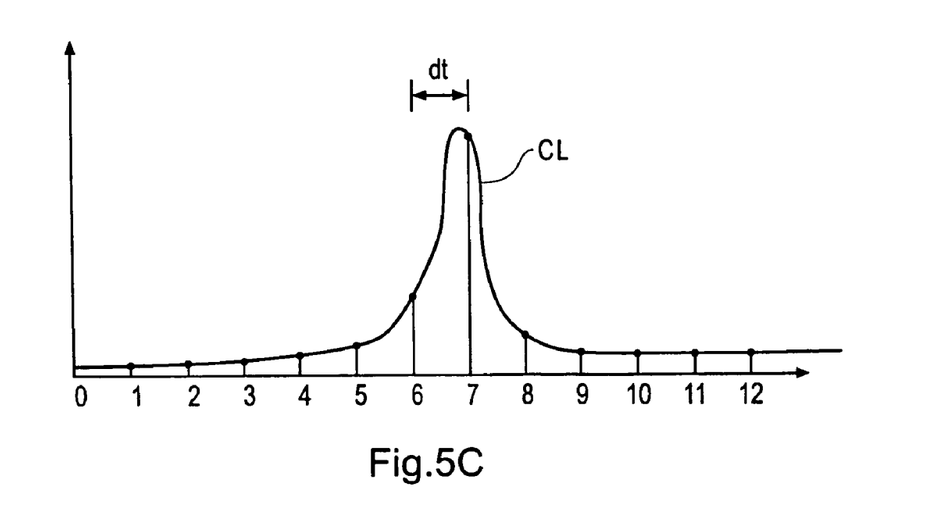
FIG. 5C is a graphical representation of correlation results for the original image and the watermarked image with respect to discrete sample shifts.

As shown in FIG. 5C, for a shift of between 7 and 8 samples, the correlation peak is highest. The offending watermarked image is therefore shifted by this amount with respect to the original image to perform registration.

Improved Decoding

An explanation of an improved detecting process with respect to the general detecting process described above will now be described, which is also disclosed in co-pending UK patent applications 0129840.5. As explained above the encoding data processing apparatus is arranged to introduce a code word into a sequence of video images, which typically form a moving image sequence and may be for example a sequence of MPEG compression encoded images. According to an aspect of the present invention the encoder is arranged to divide the code word into a plurality of parts and to embed each part into a corresponding plurality of video images.

Figure 6:
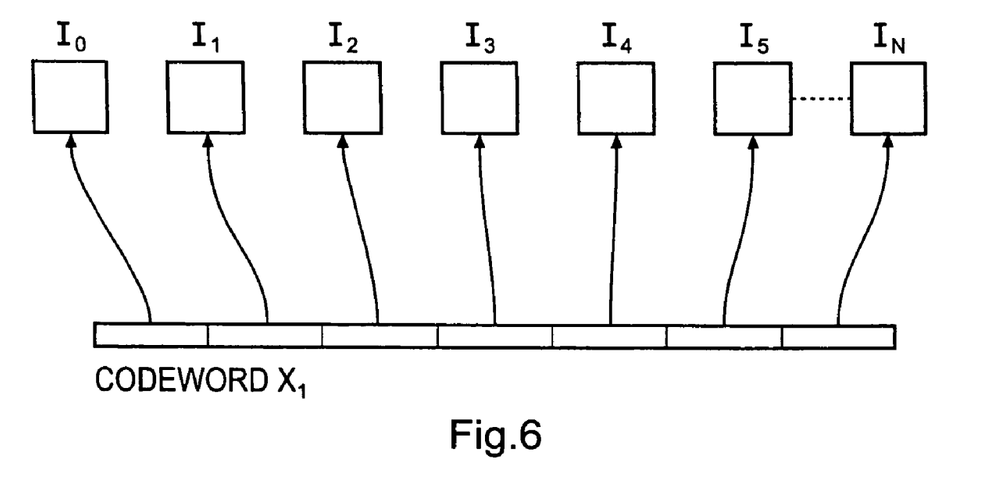
FIG. 6 is a schematic representation of an encoding process in which each part of a code word is combined with one of the images of a video sequence.

An illustration of the encoding process is shown in FIG. 6. As shown in FIG. 6 parts into which a code word $X^1$ is divided are embedded into a plurality of video images $I_0, I_1, I_2, I_3, I_4, I_5, \ldots I_N$. Each part of the code word is embedded into a corresponding one of the video images.

As will be explained shortly, embodiments of the present invention can provide an improvement in detecting code words with which a material item has been watermarked. For the present example the material comprises video images, which are suspected as having been generated from a pirated copy of a marked version of the original. As already explained, to accuse a recipient of the marked version, the code word corresponding to that recipient must be detected in the video images.

One factor in reducing the probability of correctly detecting a code word which is present in a marked material item is corruption or other noise which may have been introduced into units which the material is comprised. A result of this corruption is to reduce the correlation value sim(i), as a result of including corrupted parts of the code word recovered from the corrupted material units in the calculation of the correlation value. The corrupted parts can have a detrimental affect on the correlation value sim(i) calculated for a particular code word. For the present example, the effect of some corrupted video images can prevent a sim(i) value exceeding the threshold for a code word which is present in the marked video material. This is because the sim(i) calculation described above provides a correlation value of the re-generated code word with respect to the recovered code word, and can be upset by the presence of noise or corruption in the suspect video images. This can have an effect of biasing the sim(i) calculation to prevent the correlation value exceeding the threshold for the correct code word.

As explained above and according to the previously proposed watermarking system disclosed in UK patent applications 0129840.5, 0129836.3, 0129865.2, 0129907.2 and 0129841.3, the whole code word is recovered from the video images and used to form the correlation value. Accordingly, the calculation of the sim(i) provides a correlation value, which is independent of local statistical variations of the content of the video images and the content of the parts of the code word.

To address a problem associated with a reduction in the correlation value resulting from corrupt video images, preventing an otherwise present code word from exceeding a correlation threshold, a dependent correlation value is formed. Embodiments of the present invention can provide a detecting apparatus which is arranged to detect the presence of a code word in a sequence of video images by forming a dependent correlation value from the separate parts of the code word.

The dependent correlation value is formed by calculating the correlation value sim(i), of a part of the code word only. The part of the code word is recovered from one of the video images, and is correlated with a corresponding part of each of the code words of the set. If the dependent correlation value is sufficient to exceed the threshold according to the predetermined false detection probability, then a codeword can be declared as being present. However, if the dependent correlation value sim(i), calculated for the part of the code word recovered from a video image is not sufficient to exceed the threshold, then the part of the code word is combined with a part of the code recovered from a subsequent image in the video sequence and the dependent correlation value sim(i) re-calculated.

The dependent correlation value is formed by combining the parts of the code word recovered from a plurality of successive video images and the dependent correlation value sim(i) re-calculated with respect to the corresponding part of each re-generated code word. If the dependent correlation value sim(i) for the plurality of successive images does not exceed the threshold, then the parts of the code word recovered from the next plurality of successive images are combined and the dependent correlation value for these parts determined. If the threshold is exceeded then the corresponding code word is identified as being present. However, if the threshold is not exceeded, then the parts of the code word from the first plurality of images are combined with the parts from the second plurality of images. For the combined parts providing an increased code word length, the dependent correlation value is re-calculated, with a proportionally increased likelihood of exceeding the threshold. This process is repeated for a subsequent plurality of images, providing yet further correlation values and increasing the length of the part of the code word used to determine the dependent correlation value in a hierarchical fashion.

If the dependent correlation value for any part of the code word includes parts, which have been corrupted, then the dependent correlation value produced from these parts will not exceed the threshold. However, since other dependent correlation values will not include these corrupted images, then these dependent correlation values may exceed the threshold, whereas the independent correlation value determined for the entire video sequence may not have exceeded the threshold. This is because the parts of the code words from the corrupted images would be included in the calculation of the correlation value.

The operation of the data processing apparatus shown in FIG. 2 to detect a code word from a dependent correlation value sim(i) will now be described with reference to FIGS. 7 and 8.

Figure 7:
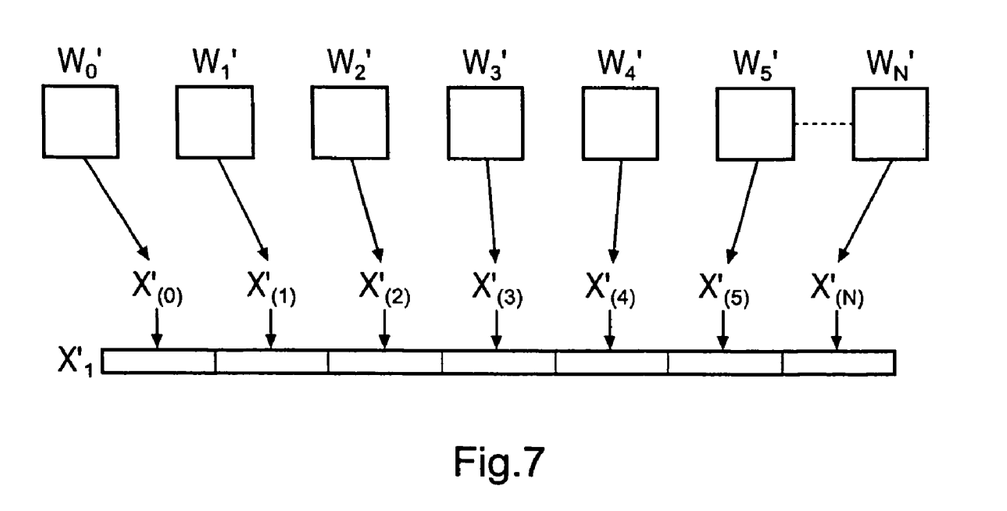
FIG. 7 is a schematic representation of a recovery decoding process in which the parts of the code word are recovered from video images.

As illustrated in FIG. 7, the recovery processor 40 operates substantially as described above to generate a recovered part of the code word X' from each image of the suspect video sequence. Each recovered code word $X^i$ is then fed to the correlator 52 via the first input. As explained above, the correlator 52 receives a corresponding part of the regenerated code words $X^i$ produced by the code word generator 54, and forms n similarity sim(i) values, one for the correlation of the recovered code word part and each of the n re-generated code word parts $X^i$. As explained above the detector 60 is arranged to determine which of the dependent correlation values sim(i) exceeds the threshold TH determined in accordance with a desired false negative detection probability. However, in some embodiments the detector may identify a largest of the sim(i) values and only calculate subsequent dependent correlation values in order to reduce an amount of computation required to detect a code word. The operation of the detector 60 to detect a code word in accordance with a dependent sim(i) value will now be described with reference to FIG. 8.

Figure 8:
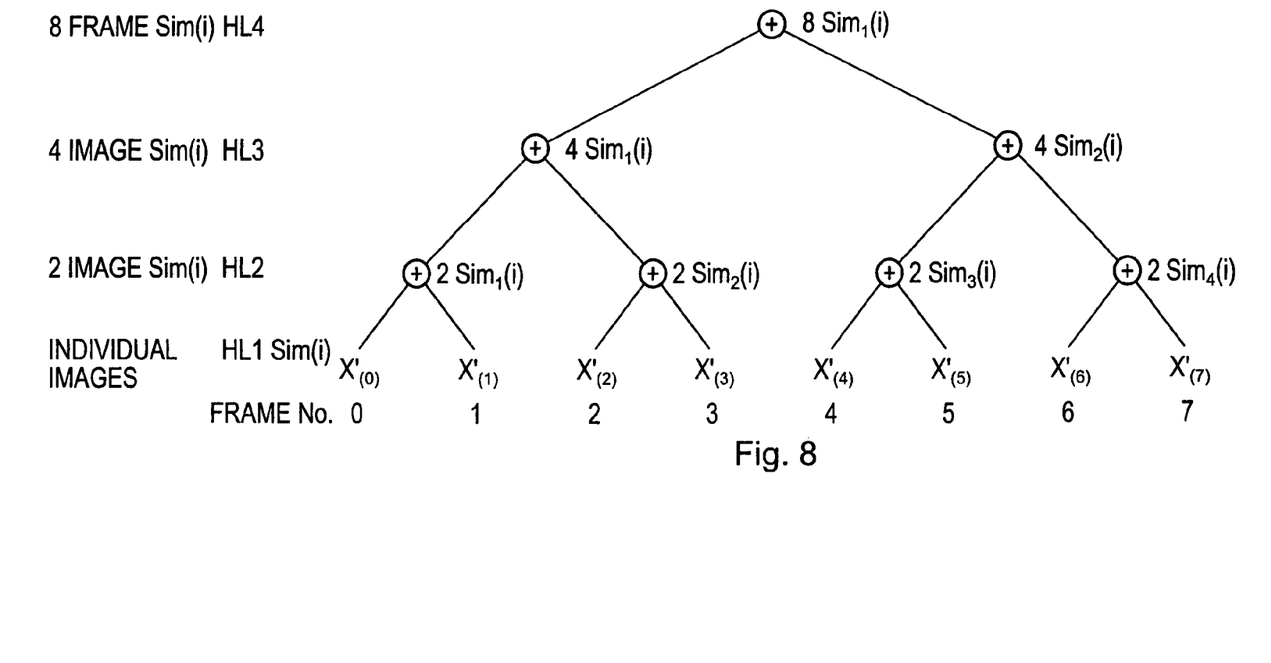
FIG. 8 is a schematic representation of a detection process embodying the invention in which the parts of the code word recovered from the images of FIG. 7 are used to form different correlation values in a hierarchical manner.

FIG. 8 provides a hierarchical representation of an arrangement for combining parts of recovered code words to form a dependent correlation values. Along a horizontal axis representing a first hierarchical level HL1 the parts of the recovered code words shown in FIG. 7 are presented. The correlation value for each of these recovered code word parts is calculated by the correlator 52, under the control of the detector 60. The sim(i) values for each video image or correspondingly each recovered code word part for the first hierarchical level HL1 is represented graphically in FIG. 9 with respect to the threshold TH. As will be seen in FIG. 9, none of the sim(i) values calculated for the individual images exceeds the threshold TH. For this reason the detector 60 proceeds to the next hierarchical level HL2 and combines parts of successive pairs of images to form a dependent correlation value for two successive images. The dependent correlation value for the second hierarchical level HL2 is shown plotted with the dependent correlation values sim(i) for the first level HL1 in FIG. 9. If none of the correlation values at the second hierarchical level HL2 exceeds the threshold, then the detector proceeds to the third level HL3, where the parts of the code word formed in the second hierarchical level HL2 are combined to calculate dependent correlation values sim(i) for four successive images in the third hierarchical level HL3.

Figure 9:
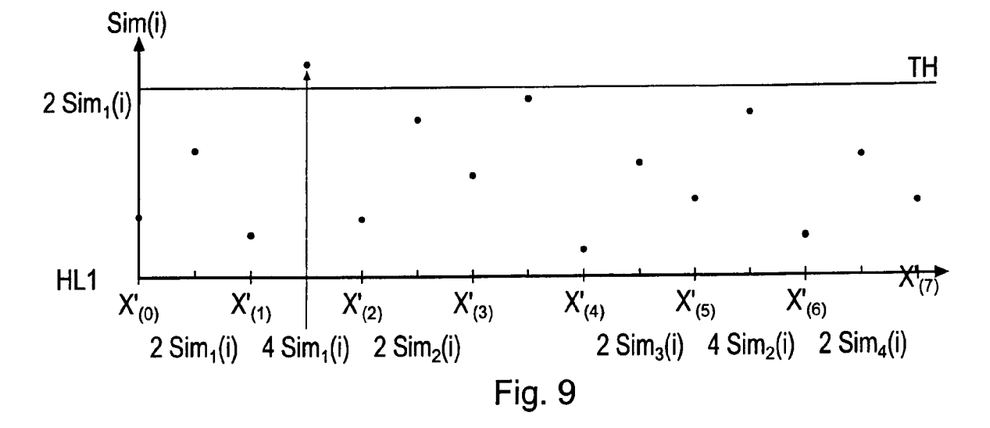
FIG. 9 is a graphical representation of dependent correlation values with respect to each of the hierarchical parts of the code word illustrated in FIG. 9.

As illustrated in FIG. 9, the correlation value for the first set of four images (0, 1, 2, 3) exceeds the threshold TH. Accordingly, at this point the detector stops processing and declares the recipient of the video sequence corresponding to the detected code word as guilty. However, it will be appreciated that, if the threshold for a code word was not exceeded at the third hierarchical level HL3, then processing would proceed to a fourth hierarchical level HL4, where parts of the code word for eight successive images are combined to form a dependent correlation value, and so on in an iterative manner.

Embodiments of the invention utilise a general likelihood that a quality of parts of recovered code words recovered from video images of a suspect video sequence are correlated. The correlation has an effect that corrupted images are more likely to occur together, and correspondingly good quality images are also more likely to occur together. As a result, by calculating dependent correlation values by combining code word parts from successive images, in iteratively increasing numbers, an improvement in the likelihood of correctly detecting a code word as being present is provided. The process proceeds until the dependent correlation value exceeds the determined threshold, thereby providing an improved likelihood of correctly detecting a given code word. Correspondingly the false detection probability is reduced.

Fourier Decoding

Figure 10:
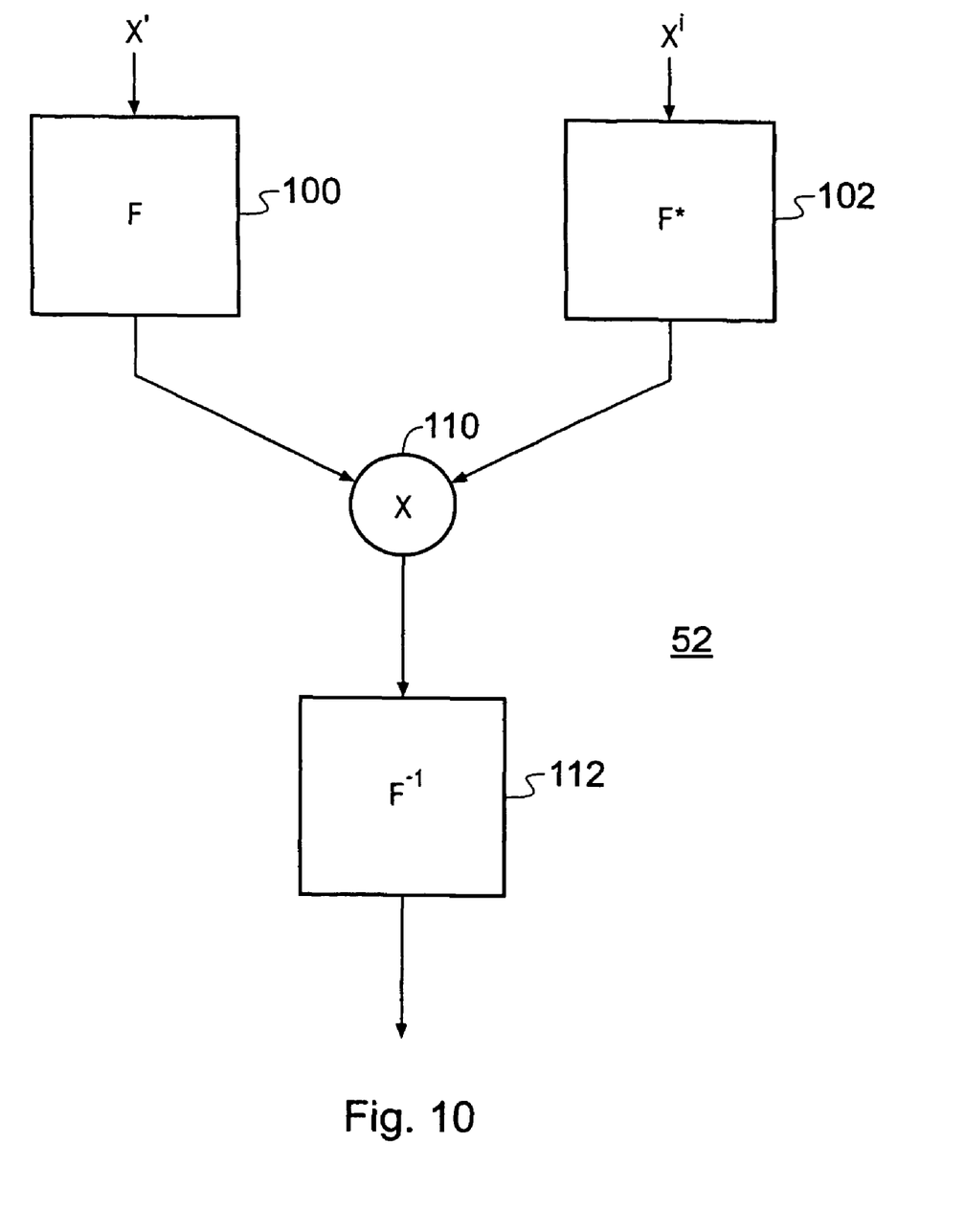
FIG. 10 is a schematic block diagram of a Fourier transform correlator forming part of the detecting data processing apparatus shown in FIG. 2.

A correlator in accordance with an embodiment of the present invention is illustrated in FIG. 10. The correlator shown in FIG. 10 takes advantage of a technique for calculating the correlation sum sim(i) shown above. In accordance with this technique the correlation sum is calculated in accordance with the following equation:

$F^{-1}[F(X')F(X^{(1)})']$, where $F(A)$ is the Fourier transform of A and $F^{-1}(A)$ is the inverse Fourier transform of A. The correlator is also described in UK patent application number 0129840.5.

The corrolator 52 shown in FIG. 10 comprises a first Fourier transform processor 100, and a second Fourier transform processor 102. Fourier transform processors 100, 102 may be implemented using Fast Fourier transform algorithms. The second Fourier transform processor 102 also forms the complex conjugate of the Fourier transform of the regenerated code word $X^i$. The Fourier transform of the recovered code word X' and the complex conjugate of the Fourier transform of the regenerated code word $X^i$ are fed to first and seconds inputs of a multiplier 110. The multiplier 110 multiplies the respective samples from each of the Fourier transform processors 100, 102 and feeds the multiplied samples to an inverse Fourier transform processor 112. At the output of the correlator an inverse Fourier transform of the multiplied signals samples is formed.

As will be appreciated, the implementation of the correlator 52 shown in FIG. 10 provides an advantage in terms of time taken to compute the correlation for the n sample values of the regenerated code word $X^i$ and the recovered code word X'. This is because the Fourier processors 100, 102, 112 can be formed from FFT integrated circuits such as, for example, are available as ASICS. Furthermore, the inverse Fourier transform provided at the output of the corrolator 52 provides n similarity values sim(i) corresponding to n correlation sums. However, in order to utilise the properties of the corrolator 52, shown in FIG. 10 the code words are arranged to be generated by cyclically shifting one code word generated $X^{(1)}$ using a particular seed for the random number generator. This is illustrated below.

As represented below, the first code word $X^{(1)}$ is represented as values $x_1$ to $x_n$ which corresponds to the pseudo randomly produced numbers from the code word generator 8.

However, the second code word $X^{(2)}$ is produced by performing a cyclic shift on the first code word $X^{(1)}$. Correspondingly, each of the other code words are produced by correspondingly cyclically shifting further the code word $X^{(1)}$ until the n-th code word is a code word shifted by n−1 positions.

$$X^{(1)} \to (x_1, x_2, x_3, x_4 \ldots, x_{n-1}, x_n)$$

$$X^{(2)} \to (x_2, x_3, x_4 \ldots, x_{n-1}, x_n, x_1)$$

$$X^{(3)} \to (x_3, x_4 \ldots, x_{n-1}, x_n, x_1, x_2)$$

$$X^{(n)} \to (x_n, x_1, x_2, x_3, x_4, \ldots x_{n-2}, x_{n-1})$$

By using this set of code words to form part of, or the whole of, the set of code words produced by the encoding image processor, the Fourier transform correlator 52 can be used to generate in one operation all similarity values for all of the n code words. Therefore, as illustrated above, the corresponding shift of 1 to n of the original code word provides the n similarity values sim(i), and as illustrated in FIG. 4, for at least one of the code words, a large similarity value sim(i) is produced. Therefore, as will be appreciated the correlator 52 only receives one regenerated code word corresponding to the first code word $X^{(i)}$ to form the similarity values for the set of n code words as illustrated in FIG. 4. More details of the Fourier transform correlator are provided in UK Patent application number 0129840.5.

As explained above the correlation values sim(i) are formed using the Fourier transform correlator 52. To form a dependent correlation value for a part of the code word, the coefficients of the other part of the code word apart from the part recovered from the code word are set to zero. Correspondingly, for the re-generated code word a part corresponding to the recovered part is reproduced and the coefficients of the remaining parts of the re-generated code word set to zero. Fourier transforms are then formed for the recovered and the re-generated parts. Alternatively, instead of setting the remaining parts of the recovered and the re-generated code words to zero, the absent parts are simply not used to form the Fourier transform.

As will be appreciated, instead of forming the conjugate of the Fourier transform of the regenerated first code word $X^1$, the conjugate of the Fourier transform of the recovered code word could be formed. This is expressed by the second alternative of the Fourier transform correlator shown below:

$$F^-[F(X')^* F(X^{(1)})]$$

Accordingly the conjugate of one of the Fourier transform of the recovered code word and the Fourier transform of the regenerated code word is formed by the Fourier transform processors 100, 102.

Application of the Watermarking System

As disclosed in co-pending UK patent applications numbered 0215495.3 and 0215513.3, a reduced-bandwidth-version of a material item may be formed to facilitate secure distribution of the material item. The reduced-bandwidth-version may be formed by at least one of temporally or spatially sub-sampling the original material item. According to an application of embodiments of the invention, the code words can be combined with the reduced-bandwidth-version of the original material item. For video material, each part of the code word is combined with a temporally or spatially sub-sampled video image. As explained in the above co-pending applications an adapted version of the original material item is formed by subtracting the reduced-bandwidth-version from a copy of the original material item. The adapted version is then distributed to users and the reduced-bandwidth-version provided separately. A version of the original is reproduced by combining the adapted version with the reduced-bandwidth-version, thereby introducing the code words into the reproduced version of the original.

Various further aspects and features of the present invention are defined in the appended claims. Various modifications can be made to the embodiments herein before described without departing from the scope of the present invention.

The invention claimed is:

1. A data processing apparatus operable to identify a code word present in a watermarked version of a material item, such as an image or data stream the material item composed of a plurality of units and the code word composed of a plurality of parts, each part including different data from the code word, the watermarked version formed by combining each of the plurality of parts of the code word with one of the plurality of units, the apparatus comprising a hardware recovery processor operable to recover a partial code word composed of at least one of the plurality of parts of the code word from at least one of the plurality of corresponding units of the watermarked material item, and a correlator operable to generate for the watermarked material item a dependent correlation value by correlating the partial code word with a corresponding partial stored code word that is a part of a whole stored code word, and a detector operable to determine whether the whole stored code word is present in the watermarked material item based on the dependent correlation value for the partial code word exceeding a predetermined threshold, wherein when the dependent correlation value does not exceed the predetermined threshold, the correlator is operable to iteratively increase a number of parts of the partial code word used, to increase information quantity of the recovered partial code word, each time the information quantity of the partial code word is increased, the correlator is operable to generate a dependent correlation value by correlating the partial code word having increased information quantity with a corresponding partial stored code word, the iterative increasing of the information quantity of the partial code word continuing until the whole code word is recovered by the recovery processor, and correlated with the whole stored code word by the correlator, or the predetermined threshold exceeded.

2. A data processing apparatus as claimed in claim 1, wherein the detector is operable in combination with the correlator to form dependent correlation values for a plurality of partial code words in parallel, and if some of the correlation values exceed the predetermined threshold, the detector is operable to identify the code word according to a predetermined false detection probability.

3. A data processing apparatus as claimed in claim 2, wherein the detector is operable in combination with the correlator to form the dependent correlation values by combining the plurality of parts of the code word recovered from successive material units to form a partial code word, and by correlating the partial code word formed from successive material units with corresponding part of the partial stored code word.

4. A data processing apparatus as claimed in claim 3, wherein the correlator is operable to form the dependent correlation values by combining the plurality of parts of the code word recovered from a first plurality of successive units with plurality of parts of the code word recovered from second plurality of successive units to generate first and second partial code words, and correlating the first and second partial code words with corresponding parts of the partial stored code words.

5. A data processing apparatus as claimed in claim 1, wherein the correlator is operable under control of the detector
- to combine the parts of the code word recovered from a first plurality of successive units, and to form the dependent correlation value for the combined parts forming a first partial code word, the detector being operable to detect the whole code word if the dependent correlation value exceeds the predetermined threshold and otherwise
- to combine the parts of the code word recovered from a second plurality of successive units, the number of units corresponding to the first plurality, and to form the dependent correlation value for the combined parts forming a second partial code word, the detector being operable to detect the whole code word if the dependent correlation value exceeds the predetermined threshold and otherwise
- to combine the parts of the code word recovered from the first plurality of successive units with parts of the code word recovered from the second plurality of successive units, and to form the dependent correlation value for the combined parts forming a third partial code word, the detector being operable to detect the whole code word if the dependent correlation value exceeds the predetermined threshold and otherwise
- to combine the parts of the code word recovered from a third plurality of successive units, and to form the dependent correlation value for the combined parts forming a fourth partial code word, the detector being operable to detect the whole code word if the dependent correlation value exceeds the predetermined threshold and otherwise
- to combine the parts of the code word recovered from a fourth plurality of successive units, the number of units corresponding to the third plurality, and to form the dependent correlation value for the combined parts forming a fifth partial code word, the detector being operable to detect the whole code word if the dependent correlation value exceeds the predetermined threshold and otherwise
- to combine the parts of the code word recovered from the third plurality of successive units with parts of the code word recovered from the fourth plurality of successive units, and to form the dependent correlation value for the combined parts forming a sixth partial code word, the detector being operable to detect the code word if the dependent correlation value exceeds the predetermined threshold and otherwise to form iteratively the first, second, third and fourth plurality of parts of the recovered code word, and to determine whether the dependent correlation value exceeds the threshold.

6. A data processing apparatus as claimed in claim 1, wherein the detector and the correlator are operable in combination to form the dependent correlation value for at least one selected code word re-generated from a set of code words that are stored, the code word being selected from the set in accordance with the relative magnitudes of the dependent correlation value formed for each code word of the set.

7. A data processing apparatus as claimed in claim 1, wherein the whole code word is part of a set of code words that are formed from a first code word having a plurality of predetermined pseudo-randomly distributed coefficients and by generating other code words of the set by cyclically shifting the first code word, and the correlation value is formed for a plurality of the code words by
- forming a Fourier transform of the recovered partial code word,
- forming a Fourier transform of the first code word of the set,
- forming the complex conjugate of one of the Fourier transform of the recovered partial code word and the Fourier transform of the regenerated code word,
- forming intermediate product samples by multiplying each of the Fourier transform samples of the recovered partial code word and the corresponding Fourier transform samples of the first code word,
- forming correlation samples by forming an inverse transform of the intermediate product samples, each of the correlation value samples providing the correlation value for one of the set of code words, wherein the forming a Fourier transform of the part of the recovered partial code word comprises setting the remaining part of the recovered code word to zero, and forming the Fourier transform of the recovered code word, and
- the forming a Fourier transform of the first code word of the set comprises setting the remaining part of the first code word to zero, and forming the Fourier transform of the first code word.

8. A data processing apparatus as claimed in claim 1, wherein the code word has been introduced into the material item in the discrete cosine transform domain, the apparatus further comprising:
- a discrete cosine transform processor operable to transform the marked material item and the original material item into the discrete cosine transform domain, wherein the recovery processor is operable to generate the recovered partial code word by subtracting corresponding discrete cosine transform coefficients of the original material version from discrete cosine transform coefficients of the marked material version.

9. A data processing apparatus as claimed in claim 1, wherein the material is video material, the plurality of material units being video images.

10. A method of identifying a code word present in a watermarked material item, the watermarked material item composed of a plurality of units and the code word composed of a plurality of parts, each part including different data from the code word, the watermarked version formed by combining each of the plurality of parts of the code word with one of the plurality of units, the method comprising:
- recovering, by a hardware recovery processor, a partial code word composed of at least one of the plurality of parts of the code word from at least one of the plurality of corresponding units of the watermarked material item,
- generating for the watermarked material item a dependent correlation value by correlating the partial code word with a corresponding partial stored code word that is a part of a whole stored code word, and
- determining whether the whole code word is present in the watermarked material item based on the dependent correlation value for the partial code word exceeding a predetermined threshold,
- when the dependent correlation value does not exceed the predetermined threshold, iteratively increasing a number of parts of the partial code word used, to increase information quantity of the recovered partial code word, and
- each time the information quantity of the partial code word is iteratively increased, generating a dependent correlation value by correlating the partial code word having increased information quantity with a corresponding partial stored code word, the iterative increasing of the information quantity of the partial code word continuing until the whole code word is recovered by said step of recovering, and correlated with the whole stored code word by said step of generating, or the predetermined threshold exceeded.

11. A method of identifying as claimed in claim 10, wherein the generating a dependent correlation value comprises
forming dependent correlation values for each of a plurality of partial code words in parallel, and if some of the correlation values exceed the predetermined threshold, identifying the code word according to a predetermined false detection probability.

12. A method of identifying as claimed in claim 11, wherein the generating a dependent correlation value includes forming the dependent correlation values by combining the plurality of parts of the code word recovered from successive material units to form a partial code word, and by correlating the parts formed from successive units with corresponding part of the regenerated code word.

13. A method of identifying as claimed in claim 12, wherein the generating a dependent correlation value includes forming the dependent correlation values by combining the plurality of parts of the code word recovered from a first plurality of successive material units with a plurality of parts of the code word recovered from second plurality of successive units to generate first and second partial code words, and correlating the first and second partial code words with corresponding parts of the partial stored code word.

14. A method of identifying as claimed in claim 10, wherein the generating a dependent correlation value includes
combining the parts of the code word recovered from a first plurality of successive units,
forming the dependent correlation value for the combined parts forming a first partial code word, and detecting the whole code word if the dependent correlation value exceeds the predetermined threshold and otherwise
combining the parts of the code word recovered from a second plurality of successive units, the number of units corresponding to the first plurality,
forming the dependent correlation value for the combined parts forming a second partial code word, and detecting the whole code word if the dependent correlation value exceeds the predetermined threshold and otherwise
combining the parts of the code word recovered from the first plurality of successive units with parts of the code word recovered from the second plurality of successive units,
forming the dependent correlation value for the combined parts forming a third partial code word, and detecting the whole code word if the dependent correlation value exceeds the predetermined threshold and otherwise
combining the parts of the code word recovered from a third plurality of successive units,
forming the dependent correlation value for the combined parts forming a fourth partial code word, and detecting the whole code word if the dependent correlation value exceeds the predetermined threshold and otherwise
combining the parts of the code word recovered from a fourth plurality of successive units, the number of units corresponding to the third plurality,
forming the dependent correlation value for the combined parts forming a fifth partial code word, and detecting the whole code word if the dependent correlation value exceeds the predetermined threshold and otherwise
combining the parts of the code word recovered from the third plurality of successive units with parts of the code word recovered from the fourth plurality of successive units,
forming the dependent correlation value for the combined parts forming a sixth partial code word, and detecting the whole code word if the dependent correlation value exceeds the predetermined threshold and otherwise
forming iteratively the first, second, third and fourth plurality of parts of the recovered code word, and
determining whether the dependent correlation value exceeds the threshold.

15. An encoding data processing apparatus comprising:
a hardware recovery processor operable to recover a partial code word that is composed of at least one part of a whole code word, each part including different data from the code word, the partial code word recovered from a corresponding unit of a watermarked material item such as an image or data stream, the marked material item composed of a plurality of units, the marked version formed by combining each part of the code word with one of the plurality of units,
a correlator operable to generate for the watermarked material item a dependent correlation value by correlating the partial code word with a corresponding partial stored code word that is a part of a whole stored code word, and
a detector operable to determine whether the whole stored code word is present in the watermarked material item based on the dependent correlation value for the partial code word exceeding a predetermined threshold, wherein
when the dependent correlation value does not exceed the predetermined threshold, the correlator is operable to iteratively increase a number of parts of the partial code word used, to increase information quantity of the recovered partial code word,
each time the information quantity of the partial code word is increased, the correlator is operable to generate a dependent correlation value by correlating the partial code word that having increased information quantity with a corresponding partial stored code word, the iterative increasing of the information quantity of the partial code word continuing until the whole code word is recovered by the recovery processor, and correlated with the whole stored code word by the correlator, or the predetermined threshold exceeded.

16. An encoding data processing apparatus as claimed in claim 15, wherein the code word is chosen from a plurality of code words that are formed from a first code word having a plurality of predetermined pseudo-randomly distributed coefficients and by generating other code words of the set by cyclically shifting the first code word.

17. A system for identifying versions of a material item, the system comprising:
an encoding data processing apparatus operable to form marked versions of the material item by combining each version with a code word having a plurality of parts, each part including different data from the code word, the material item composed of a plurality of units, each of the plurality of parts of the code word being combined with one of the plurality of units, and
a detecting data processing apparatus operable to identify the code word present in a marked version of the material item, the detecting data processing apparatus comprising a hardware recovery processor operable to recover a partial code word composed of at least one of the plurality of parts of a code word from at least one of the plurality of corresponding units of the marked material item, a correlator operable to generate for the marked material item a dependent correlation value by correlating the partial code word with a corresponding partial stored code word that is a part of a whole stored code word, and a detector operable to determine whether the whole code word is present in the marked material item based on the dependent correlation value for the partial code word exceeding a predetermined threshold, wherein when the dependent correlation value does not exceed the predetermined threshold, the correlator is operable to iteratively increase a number of parts of the partial code word used, to increase information quantity of the recovered partial code word, each time the information quantity of the partial code word is increased, the correlator is operable to generate a dependent correlation value by correlating the partial code word having increased information quantity with a corresponding partial stored code word, the iterative increasing of the information quantity of the partial code word continuing until the whole code word is recovered by the recovery processor, and correlated with the whole stored code word by the correlator, or the predetermined threshold exceeded.

18. A non-transitory computer-readable medium having a computer program recorded thereon, the program composed of computer executable instructions, which when loaded on to a data processor causes the data processor to perform the method according to claim 10.

19. The data processing apparatus according to claim 1, wherein the iterative increasing of the number of code word parts used increases the number by a factor two for each increase.

20. The method of identifying one of the plurality of code words according to claim 10, wherein the iterative increasing of the number of code word parts used increases the number by a factor two for each increase.

21. The encoding data processing apparatus according to claim 15, wherein the iterative increasing of the number of code word parts used increases the number by a factor two for each increase.

22. The system for identifying versions of the material item according to claim 17, wherein the iterative increasing of the number of code word parts used increases the number by a factor two for each increase.

\* \* \* \* \*